US012198249B2

(12) United States Patent
Enthed

(10) Patent No.: US 12,198,249 B2
(45) Date of Patent: Jan. 14, 2025

(54) METHOD AND DEVICE FOR DISPLAYING DETAILS OF A TEXTURE OF A THREE-DIMENSIONAL OBJECT

(71) Applicant: Inter IKEA Systems B.V., LN Delft (NL)

(72) Inventor: Martin Enthed, Steninge (SE)

(73) Assignee: Inter IKEA Systems B.V., LN Delft (NL)

( * ) Notice: Subject to any disclaimer, the term of this patent is extended or adjusted under 35 U.S.C. 154(b) by 0 days.

(21) Appl. No.: 17/552,997

(22) Filed: Dec. 16, 2021

(65) Prior Publication Data
US 2022/0198737 A1    Jun. 23, 2022

(30) Foreign Application Priority Data
Dec. 17, 2020    (EP) ..................................... 20215009

(51) Int. Cl.
*G06T 15/04*     (2011.01)
*G06N 3/08*      (2023.01)
(Continued)

(52) U.S. Cl.
CPC .............. *G06T 15/04* (2013.01); *G06N 3/08* (2013.01); *G06T 15/205* (2013.01); *G06T 17/10* (2013.01)

(58) Field of Classification Search
None
See application file for complete search history.

(56) References Cited

U.S. PATENT DOCUMENTS

2003/0206176 A1*  11/2003  Ritter .................... G06T 11/001
                                                  345/582
2010/0289825 A1*  11/2010  Shin .................... G06F 3/04883
                                                  345/173
(Continued)

FOREIGN PATENT DOCUMENTS

WO    2015/142649 A1    9/2015

OTHER PUBLICATIONS

Extended European Search Report for EP Application No. 20215009.0 mailed May 26, 2021 (8 pages).
(Continued)

*Primary Examiner* — Anh-Tuan V Nguyen
(74) *Attorney, Agent, or Firm* — Merchant & Gould P.C.

(57) ABSTRACT

A computer implemented method for displaying details of a texture of a three-dimensional, 3D, object, wherein the texture comprises a periodic pattern, is provided. The method comprises, while zooming in on the 3D object: determining a portion of the 3D object, wherein the determined portion of the 3D object corresponds to a zoom level; displaying the determined portion of the 3D object including a corresponding portion of the texture. The method further comprises, upon the zoom level reaching a zoom-in threshold, executing a 3D to 2D transition comprising: identifying a two-dimensional, 2D, image representing the texture of the currently displayed portion of the 3D object from a set of 2D images, each 2D image of the set of 2D images representing the texture of the 3D object at a specific of portion of the 3D object, wherein at least one 2D image of the set of 2D images represents the texture of the 3D object at a plurality of portions of the 3D object; wherein a resolution of the 2D image is higher than a resolution of the texture of the portion of the 3D object at the zoom-in threshold.

14 Claims, 5 Drawing Sheets

(51) Int. Cl.
*G06T 15/20* (2011.01)
*G06T 17/10* (2006.01)

(56) References Cited

U.S. PATENT DOCUMENTS

| | | | | |
|---|---|---|---|---|
| 2013/0162633 | A1* | 6/2013 | Berger | G09G 5/00 345/582 |
| 2014/0232734 | A1* | 8/2014 | Nigam | G06Q 30/0621 345/584 |
| 2014/0267346 | A1* | 9/2014 | Ren | G06T 15/04 345/582 |
| 2014/0323801 | A1* | 10/2014 | Konno | A61B 1/00193 600/103 |
| 2014/0354628 | A1* | 12/2014 | Lindberg | G06F 3/04842 345/419 |
| 2015/0121297 | A1* | 4/2015 | Ying | G06F 3/04883 715/783 |
| 2015/0161823 | A1* | 6/2015 | Anderson-Sprecher | G06T 15/005 345/419 |
| 2015/0269785 | A1* | 9/2015 | Bell | G06T 13/80 345/427 |
| 2015/0325044 | A1* | 11/2015 | Lebovitz | G06T 15/04 345/420 |
| 2018/0075641 | A1* | 3/2018 | Ceylan | G06T 15/04 |
| 2018/0144547 | A1* | 5/2018 | Shakib | G06T 15/503 |
| 2018/0158246 | A1* | 6/2018 | Grau | G06T 3/0093 |
| 2018/0247446 | A1* | 8/2018 | Litvin | G06T 19/20 |
| 2018/0329609 | A1* | 11/2018 | De Swarte | G06T 19/00 |
| 2019/0156459 | A1* | 5/2019 | Chen | G06T 11/001 |
| 2020/0005550 | A1* | 1/2020 | Schneider | A61C 13/34 |
| 2020/0341607 | A1* | 10/2020 | Tandon | G06F 3/0485 |
| 2021/0182947 | A1* | 6/2021 | Wade | G06Q 30/0631 |
| 2021/0383115 | A1* | 12/2021 | Alon | G06Q 30/0276 |

OTHER PUBLICATIONS

PCT International Search Report and Written Opinion for PCT Application No. PCT/EP2021/086179 mailed Mar. 17, 2022 (13 pages).

* cited by examiner

METHOD AND DEVICE FOR DISPLAYING DETAILS OF A TEXTURE OF A THREE-DIMENSIONAL OBJECT

CROSS-REFERENCE TO RELATED APPLICATION(S)

This application claims priority to European Patent Application No. 20215009.0, filed Dec. 17, 2020, the disclosure of which is hereby incorporated by reference in its entirety. To the extent appropriate, a claim of priority is made to the above-disclosed application.

FIELD OF TECHNOLOGY

The present disclosure belongs to methods and devices for displaying details of a texture of a three-dimensional object.

BACKGROUND

Rendering and displaying three-dimensional, 3D, objects on, e.g., websites or in software applications for online commerce has recently grown immensely popular among a wide spectrum of companies. Thanks to improved internet-connection bandwidth, and/or improved processing power of electronic devices, a user may see, rotate, or perform other manipulations of a rendered 3D object, such as changing the color or the clothing of the 3D object.

A rendered 3D object, captured by, e.g., a 3D scanner, may provide an adequate visual experience to a user in view of an overall impression such as the shape or the color of the 3D object. However, the resolution of a texture of such a rendered 3D object is often relatively scarce due to the large amount of data that otherwise needs to be transferred for dense point clouds associated with such a high resolution 3D object. Moreover, despite being capable of providing a dense point cloud of a 3D object, 3D scanners are often incapable to capture subtle details of the surface of the 3D object, such as a surface texture and/or a detailed pattern of a clothing of a piece of furniture, due to the notorious difficulty of measuring short distances by such devices.

Hence, there is a need for an approach to provide deep zooming on a 3D object for enabling rendering of subtle details of the texture of the 3D object.

SUMMARY

Thus, it is an object of the invention to provide a method to provide deep zooming on a 3D object for enabling rendering of subtle details of the texture of the 3D object.

According to a first aspect, there is provided a computer implemented method for displaying details of a texture of a three-dimensional, 3D, object, the texture comprising a periodic pattern, the method comprising:
while zooming in on the 3D object:
determining a portion of the 3D object, wherein the determined portion of the 3D object corresponds to a zoom level, and
displaying the determined portion of the 3D object including a corresponding portion of the texture, and
upon the zoom level reaching a zoom-in threshold, executing a 3D to 2D transition comprising:
identifying a two-dimensional, 2D, image representing the texture of the currently displayed portion of the 3D object from a set of 2D images, each 2D image of the set of 2D images representing the texture of the 3D object at a specific of portion of the 3D object, wherein at least one 2D image of the set of 2D images represents the texture of the 3D object at a plurality of portions of the 3D object, and
displaying the 2D image, wherein a resolution of the 2D image is higher than a resolution of the texture of the portion of the 3D object at the zoom-in threshold.

Within the present specification, a "texture" refers to a digital representation of a surface of an object. In contrast to two-dimensional, 2D, properties, such as color or brightness, a texture is also associated with three-dimensional, 3D, properties, such as a transparency or reflectance of the surface of the object.

The 3D object is comprised in a 3D model. Thus, the zooming on the 3D object, as referred to herein, is typically performed in a representation of the 3D model.

The zoom level, as referred to herein, is a measure of how magnified the portion of the 3D object appears on a display. A high zoom level on the 3D object corresponds to a high magnification of the texture of the 3D object. Hence, a high zoom level corresponds to a close-up view of the texture of the 3D object being, visually, a small portion of the 3D object compared to a lower zoom level, the lower zoom level accordingly corresponding to a larger visible portion of the 3D object. When reaching a zoom-in threshold, i.e., when reaching an upper limit of the magnitude of the zoom level, a 3D to 2D transition is executed. Such an upper limit may be determined according to a minimal acceptable resolution of the zoomed in portion of the 3D object. The 3D to 2D transition, refers to a transition of a rendering of a zoomed in portion of the 3D object and a rendering of a 2D image comprising a higher resolution. The 2D image is thus not part of the texture of the 3D object but part of a set of high resolution 2D images separate from the 3D object.

This may allow to further zoom in on the 2D image corresponding to the zoomed-in portion of the 3D object to further explore a high-resolution rendering of the texture of the 3D object. Consequently, the resolution of the texture of the 3D object can be kept at a lower level, thus reducing the memory requirements for storing the 3D object. Moreover, by going from rendering a 3D object, which includes shading of the texture etc., to rendering a 2D image, valuable computational resources may be saved.

As of the presumed periodic pattern of the surface of the 3D object, a single 2D image of a periodically occurring portion of the texture of the 3D object may be used. Hence, when zooming in on differently located such periodically occurring portions to such a degree that the zoom-in threshold is reached, the same 2D image may be reused at every such a periodically occurring portion. This may allow a detailed representation of the texture of the whole surface of the 3D object represented by only a fraction of high-resolution, HR, 2D images, thereby reducing disk space and/or enhancing the speed of the rendering. Further, in a server-device system architecture, bandwidth may be saved due to the limited number of 2D images to be transferred to an electronic device used for zooming, and due to the lower requirements of the resolution of the 3D object since the deep zooming functionality being facilitated by the 2D images.

The 3D to 2D transition may be rendered during a time period of the order of seconds. This may allow a fast and convenient user experience for deep zooming to explore the details of the texture of the 3D object.

The method may further comprise, while displaying the determined portion of the 3D object, shifting a view direction of the 3D object to be parallel with a surface normal of the surface of the 3D object.

The shifting of the view direction may be made during the zooming in on the 3D object. This may allow for a smooth user experience and an improved user-machine interface. The displaying of the 2D image may be made upon the shifting of the view direction is completed.

The method may comprise determining an identifier of the 3D object, thereby determining the set of 2D images. The identifier may correspond to a class of objects, e.g., sofas or pillows. The identifier may also correspond to a specific type of object within a class of objects, such as a specific type of sofa or a specific type of pillow. The identifier may also identify the pattern of texture, e.g. a clothing of the object. This may enhance the flexibility of the method.

The identification of the 2D image may comprise finding a best correspondence between the portion of the 3D object and the images of the set of 2D images.

The finding of a best correspondence between the portion of the 3D object and the images of the set of 2D images may comprise inputting a sample of the texture of a currently displayed portion of the 3D object in a neural network being trained to output a 2D image representing a best match texture.

A neural network algorithm may be capable of recognizing patterns and symbols from relatively scarce resolution images. Hence, the texture of the displayed portion may comprise a relatively low resolution, yet to be detailly explored by the user by the presented method. The training of the neural network may allow minimizing errors while finding the best correspondence and thereby enhancing accuracy and speed of the method. This may further allow the 3D model of the 3D object to be relatively low resolution without compromising on the user experience. Hence, disk space and bandwidth may be saved. Accordingly, CPU and/or GPU time and power may be saved.

The finding of a best correspondence between the portion of the 3D object and the images of the set of 2D images may comprise an image comparison between a sample of the texture of a currently displayed portion of the 3D object and the textures represented by the 2D images in the set of 2D images. The sample of the texture may refer to the whole visible part of the texture from a specific view angle on the 3D object. Alternatively, the sample of the texture may refer to portion of the visible part of the texture. Yet another option is that the sample of the texture may refer to a down-sampled version, e.g., a version of the sample of the texture having a lower resolution. Any known image comparison algorithm may be used for determining a similarity measure between a specific image and a set of images. Such an image comparison algorithm may include one or more of a pixel-to-pixel comparison, edge detection/comparison, or the like.

The image comparison algorithm may comprise a transformation of the texture of a currently displayed portion of the 3D object to be parallel with a surface normal of the surface of the 3D object, to facilitate the image comparison.

The finding of a best correspondence between the portion of the 3D object and the images of the set of 2D images may comprise accessing a conversion table between specific portions of the 3D object and the 2D images in the set of 2D images. Such a conversion table may enhance the speed and efficiency of the method.

The 3D to 2D transition may further comprise displaying a merge of the portion of the 3D object and the 2D image. The 3D to 2D transition may thus appear smooth and may thereby enhance the user experience.

The merge of the portion of the 3D object and the 2D image may be set to gradually change from 100% of the portion of the 3D object to 100% of the 2D image. Such a gradual change may occur during a time period of the order of seconds. The gradual change may be linear in time or zoom level such that the gradual change is done at a constant rate of change.

The method may further comprise zooming and/or panning in the 2D image. By enabling further zooming in the 2D image may allow the user to further explore details of the texture of the 3D object. Provided a user has zoomed in further on the 2D image, the user may pan in the 2D image. This may allow the user to conveniently explore the details of the texture of the 3D object and thus an improved user-machine interface.

The method may further comprise, upon a zoom level in the 2D image reaches a zoom-out threshold, executing a 2D to 3D transition comprising displaying a portion of the 3D object corresponding to a currently displayed portion of the 2D image. The reverse zoom direction allows zooming out for overviewing the 3D object. This may be useful, should the user wish to zoom in on another portion of the 3D object being located on a different location of the 3D object.

Each 2D image of the set of 2D images may represent the texture of the 3D object at a plurality of portions of the 3D object. This may allow using a reduced number of 2D images for representing the whole texture of the 3D object, thereby reducing the required disk space for respective texture of respective 3D object.

According to a second aspect, there is provided a non-transitory computer-readable storage medium having stored thereon program code portions for implementing the method according to the first aspect when executed on a device having processing capabilities.

According to a third aspect, there is provided an electronic device comprising:
  a display; and
  circuitry configured to execute:
    a 3D zooming function configured to determine a portion of a 3D object corresponding to a zoom level, and display the determined portion of the 3D object including a texture comprising a periodic pattern on the display; and
    a 3D to 2D transition function configured to monitor the zoom level and upon the zoom level reaching a zoom-in threshold execute a 3D to 2D transition comprising:
      identify a two-dimensional, 2D, image representing the texture of the currently displayed portion of the 3D object from a set of 2D images, each 2D image of the set of 2D images representing the texture of the 3D object at a specific of portion of the 3D object, wherein at least one 2D image of the set of 2D images represents the texture of the 3D object at a plurality of portions of the 3D object; and
      display the 2D image on the display, wherein a resolution of the 2D image is higher than a resolution of the texture of the portion of the 3D object at the zoom-in threshold.

The above-mentioned features of the method, when applicable, apply to the second and third aspects as well. In order to avoid undue repetition, reference is made to the above.

The 3D to 2D transition may further comprise, while displaying the determined portion of the 3D object, shift a view direction of the 3D object to be parallel with a surface normal of the surface of the 3D object.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments, with reference to the appended drawings, where the same reference numerals will be used for similar elements, wherein.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

Figure 1:
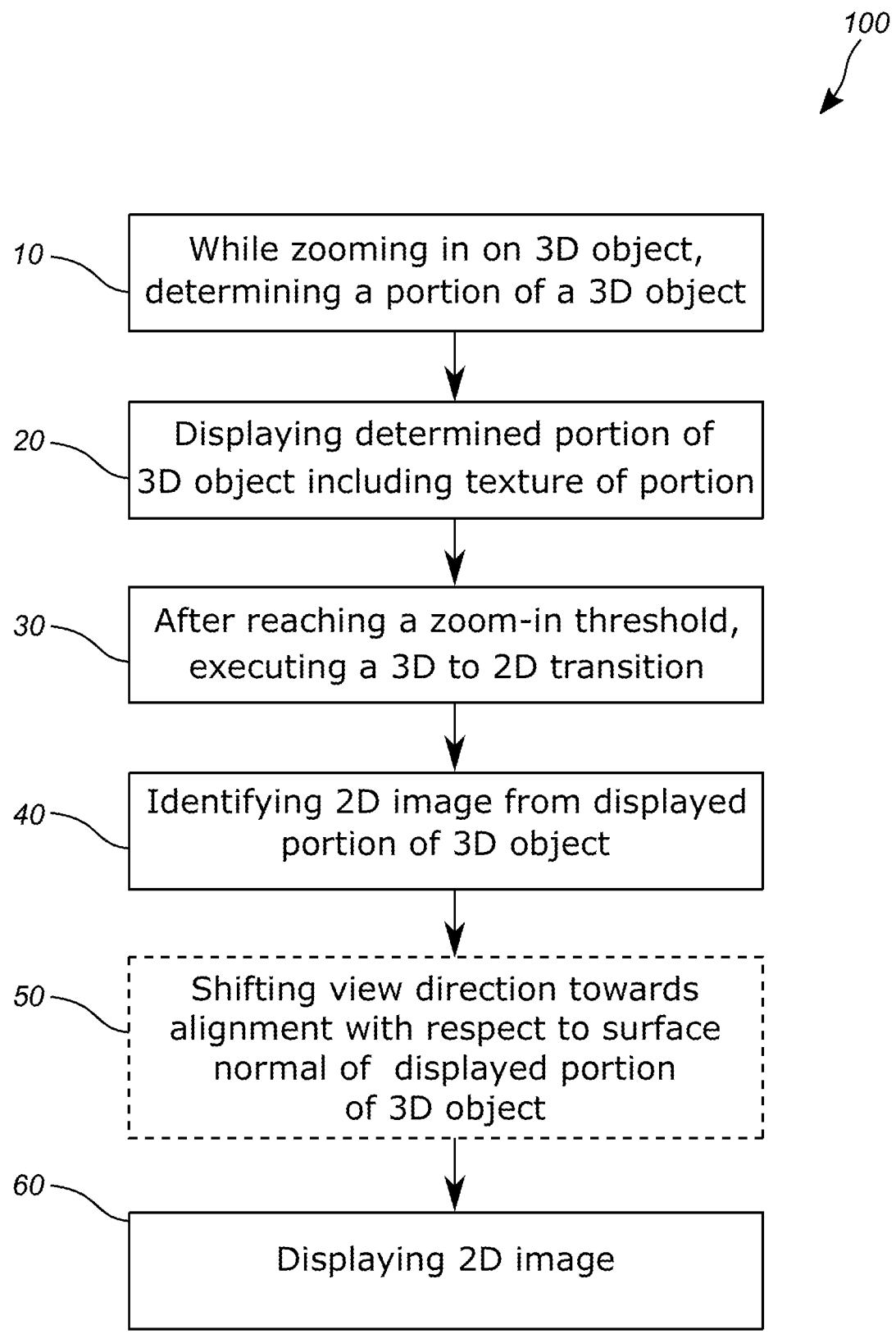
FIG. 1 schematically shows a flowchart of an example of the disclosed method.
Figure 2:
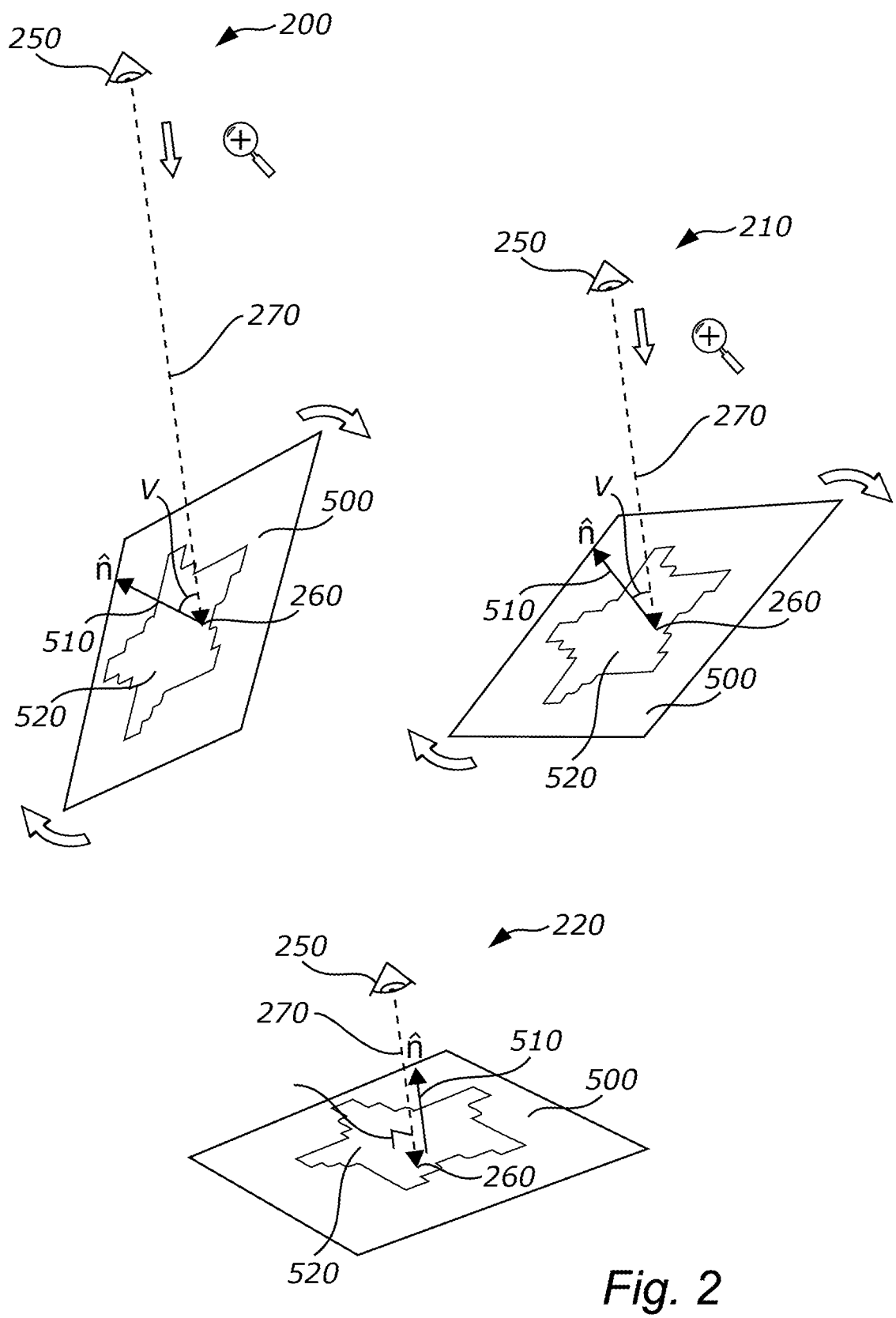
FIG. 2 schematically shows an aligning of a view angle while zooming in on a portion of a 3D object.
Figure 3:
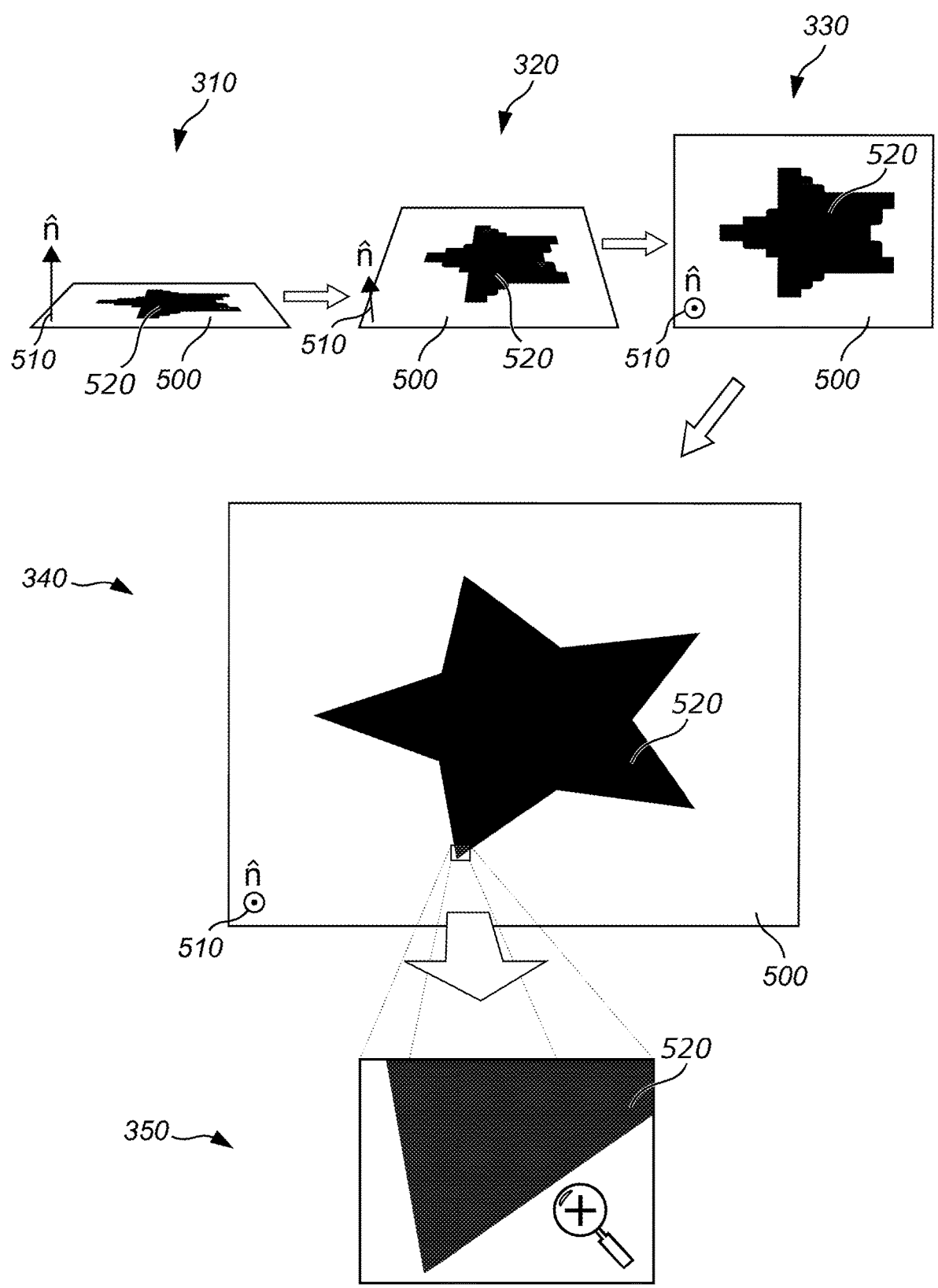
FIG. 3 schematically shows a 3D to 2D transition while zooming in on a portion of the 3D object.

In connection with FIG. 1, there is schematically shown a flowchart of an example of a computer implemented method 100 for displaying details of a three-dimensional, 3D, object, 1000 wherein the texture comprises a periodic pattern. The 3D object 1000 may be comprised in a 3D model, wherein the 3D model of the 3D object 1000 may be established using any adequate 3D modelling technique, such as a 3D scanner, a 360-degree camera, or the like. "The computer implemented method" 100 may be referred to as "the method" 100 henceforth. FIGS. 2 and 3 may pictorially emphasize the described method steps below, hence preferably to be inspected while reading the description of FIG. 1.

The method 100 comprises, while zooming in on the 3D object 1000, determining a portion 500 of the 3D object 1000, wherein the determined portion 500 of the 3D object 1000 corresponds to a zoom level. The wording "zooming in" typically, and also herein, refers to magnifying a portion of a digital representation, such as a surface of a 3D object 1000, an ordinary 2D image, etc., for enhancing a rendering of image details of such a portion. The zoom level may refer to a magnification of a length element of a displayed element on a display. For instance, assuming a start position for viewing the displayed element has a zoom level of 100%, a zoom level of 200% implies that the length element of the displayed element appears twice as long on the display. Accordingly, an area portion of the displayed element appears four times larger in such a situation.

The determined portion 500 of the 3D object 1000 may be a portion of the surface of the 3D object 1000 that is significantly smaller than the total surface of the 3D object 1000. The determined portion 500 of the 3D object 1000 may be a portion of the surface of the 3D object 1000 that is significantly smaller than a total surface of the 3D object 1000, seen from a specific view angle V when viewing the 3D object 1000. That is, from a specific view angle V of the 3D object 1000 and/or a specific viewing distance from the 3D object 1000, it may be impossible to see the total surface of the 3D object 1000. For instance, a "rear side" of a 3D object 1000 is invisible to a viewer when the 3D object 1000 is viewed from the "front side". Throughout this disclosure it is assumed that the 3D object 1000 is opaque. However, the method may equally well be applied on an at least partly visually transparent 3D object 1000 such as a pleated thin curtain.

The 3D object 1000 may be a piece of furniture. By way of example, the 3D object 1000 may be a sofa (see, e.g., FIG. 5), a table, a bookshelf, or the like. The 3D object 1000 may thus comprise an arbitrarily curved surface. By way of example, a sofa may be enclosed by a clothing, the clothing hence being a curved surface. However, the 3D object 1000 may also be a carpet comprising a surface being substantially two-dimensional, 2D. The method applies equally well to such a 2D surface. For a 2D surface, the whole surface of interest may be viewed from a specific view angle and/or viewing distance, in contrast to, e.g., a sofa or a table.

The method 100 comprises, while zooming in on the 3D object 1000, displaying 20 the determined portion 500 of the 3D object 1000 including a corresponding portion of the texture. The determined portion 500 may be a surface portion of the 3D object 1000. The displaying 20 may be done on any type of display 410 for displaying digital information. By way of example, such a display 410 may be any one of a smartphone display, a computer display, a tablet display, a TV, smart glasses, a dedicated AR or VR device, or the like. The determined portion 500 may generally have a surface normal 510 pointing in a direction being non-parallel to a view direction on the determined portion. This is visualized in, e.g., FIG. 2. That is, the view direction 270 may refer to a vector pointing between an artificial substantially point-like location, being the artificial view location 250 of an artificial camera or an eye of a viewer of the 3D object 1000, and a central point 260 on the determined portion 500. The view direction 270 may be defined based on a solid angle between the surface normal 510 of the determined portion 500 and a vector 270 between the artificial view location 250 and the central point 260 of the determined portion 500. The central point 260 on the determined portion 500 may be substantially centrally located on the determined portion 500. For instance, the central point 260 on the determined portion 500 may be a center of mass of the determined portion 500. The artificial view location 250 may be a simulated position of a camera being artificially located in the 3D model. Hence, when viewing, e.g., a sofa in a 3D model from a certain artificial viewing point 250, a vast majority of all possible surface portions of the clothing of the sofa have surface normals pointing in a direction being non-parallel to the view direction. This is true also when viewing a carpet from a viewing point straight above the carpet, provided the distance between the viewing point and the carpet is finite and provided rendering of the carpet in any type of perspective view. In such a situation, a picture plane, i.e., the plane of the carpet, is parallel to two Cartesian axes of the scene, hence being a so-called one-point perspective view, wherein parallel lines perpendicular to the picture plane converge at a vanishing point. A similar situation may be a photo taken at a railway towards a corresponding vanishing point a significant distance away, at an end of sight of the railway. At such a photo, the rails are non-parallel. It is to be noted however, that if such a carpet is rendered in an isometric view, the whole surface of the carpet may be perpendicular to the view direction. The method 100 is applicable to any type of view, such as any type of perspective view, an isometric view, etc. The view direction 270 may occasionally refer to a view angle. Hence, to enable viewing the determined portion 500, the angle V between the surface normal of the determined portion and the view direction may lie in the range of 0-90 degrees, provided the surface of the determined portion is substantially flat. The wording "flat" generally, and also herein, refers to a surface being represented by a Euclidian plane spanned by two non-parallel basis vectors.

The method 100 comprises, upon the zoom level reaching a zoom-in threshold, executing 30 a 3D to 2D transition. Preferably, a texture recognition, further described below, of the texture of the determined portion 500 has been performed when the zoom-in threshold has been reached. Alternatively, the texture recognition is done while approaching the zoom-in threshold, the texture recognition thereby starting at an additional zoom-in threshold, the additional zoom-in threshold corresponding to a smaller (more zoomed out) zoom level. The texture recognition may in such a situation be continuously performed while panning between the additional zoom-in threshold and the zoom-in threshold. The 3D to 2D transition may utilize multithreading, i.e., exploiting the ability of a CPU to provide a plurality of threads upon execution.

The zoom-in threshold may be set by a user according a user preference. The zoom-in threshold may be predefined. The zoom-in threshold may be set such as depending on the context/use-case and/or object type. The zoom-in threshold may represent a zoom-in to such a degree that a resolution of the displayed determined portion 500 falls below a minimal allowed resolution of the displayed determined portion. A resolution typically, and also herein, refers to a pixel density, e.g., the number of pixels per length unit or the number of pixels per area unit. The resolution may be measured in "pixels per inch" (ppi), i.e., the number of pixels fitting on a line having a length of one inch (approximately 2.54 cm). Hence a "high resolution" refers to a relatively high number of pixels per inch, or, more generally, a relatively high number of pixels per length unit. The minimal allowed resolution of the displayed determined portion may depend on a resolution of the display used to display the determined portion. Hence, a determined portion of the 3D object 1000 may be represented by a predefined number of pixels. When viewed from a certain viewing distance away from the 3D object 1000, and from a certain view direction 270, the resolution of the determined portion 500 may allow a substantial zooming in on the determined portion 500 while the determined portion 500 appear sharp on a display. That is, as long as the pixel density of the determined portion does not fall below the pixel density of the display while zooming in, zooming in may be allowable. Zooming in further in such a situation may however be possible to a certain extent. When referring to a "sharp" 3D or 2D image, the corresponding 3D or 2D image comprises digital information corresponding to a pixel density that is equal to or larger than a portion of the display on which the 3D or 2D image is displayed. That is, assuming an ordinary 2D image of raster-graphics type having a resolution of 1920×1080 pixels (HD resolution) is displayed on a display having a resolution of 3840×2160 pixels (4 k resolution), the image may be considered being sharp only if the image is zoomed in to such an extent that it fills a maximum of 25% of the display area in question. Zooming in further on such an image hence implies that a pixel of the image is smoothen out to a plurality of pixels on the display, such that the image may appear unsharp/smooth/soft on the display. It is to be noted however that a level of detail of a 3D or 2D image is independent of the resolution of a display used to display the 3D or 2D image. It is further noted that many displays of today have a pixel-density/display-size ratio so high that the human eye cannot distinguish between individual pixels without magnifying means. An image may hence appear "sharp" to the human eye, despite technically being unsharp according to the above. The method 100 is thereby not limited to the resolution of a display used for the displaying described herein.

While continuing zooming in, after such a zoom-in threshold has been reached, the 3D to 2D transition 30 of the digital representation is executed. In the 3D to 2D transition 30, a transition is executed from displaying the determined portion of the 3D object 1000 to display a 2D image that corresponds to the determined portion 500 of the 3D object 1000. The 2D image has a resolution that is higher than the resolution of the determined portion 500 of the 3D object 1000. Hence, the user may zoom in further, to a certain extent, on the 2D image without falling below the resolution of the display, i.e., maintaining a sharp displayed representation of the 2D image. The 2D image may be captured by any suitable device. The 2D image may be captured by a digital camera. The 2D image may be of any graphics type. The 2D image may be of raster-graphics type. The 2D image may be of vector-graphics type. The 2D image may be either or both of a raster-graphics type and a vector-graphics type. Should the 2D image be of raster-graphics type, the 2D image may be converted to vector-graphics type by a built-in converter. Similarly, an opposite such a conversion may be applied. If the 2D image is of vector-graphics type the user may zoom in further, compared to a corresponding raster-graphics type of the 2D image, as vector graphics generally allows displaying a sharp image regardless of the zoom level. It is to be noted however, that 2D images of vector-graphics type that have a high level of details, generally requires a relatively large amount of disk space. Hence, for detailed and/or large patterns of the texture of the surface of the 3D object 1000, the 2D image may preferably be of raster-graphics type. Conversely, for simple and/or slowly varying patterns of the texture of the surface of the 3D object 1000, the 2D image may preferably be of vector-graphics type. If the 2D image is of raster-graphics type the user may zoom in to such an extent that the pixel density of the 2D image corresponds a pixel density of the display for displaying the 2D image. Zooming in even further may be possible, as is typically the case when zooming in images on an ordinary computer- or smartphone display, although the 2D image may then appear unsharp/soft.

The 3D to 2D transition comprises identifying a 2D image 40 representing the texture of the currently displayed portion 500 of the 3D object 1000 from a set of 2D images. Hence, the texture of the displayed portion 500 of the 3D object 1000 may be displayed further refined by attributing a 2D image having higher resolution compared to the corresponding relatively low-resolution displayed determined portion 500 of the 3D object 1000. The identification of the 2D image may comprise finding a best correspondence between the portion of the 3D object 1000 and the images of the set of 2D images. The finding of a best correspondence between the portion of the 3D object 1000 and the images of the set of 2D images may comprise inputting a sample of the texture of a currently displayed portion of the 3D object 1000 in a neural network being trained to output a 2D image representing a best match texture. The sample of the texture of the currently displayed portion may be the entire texture in view or at least a portion of the texture in view. Alternatively, or additionally, the sample of the texture of the currently displayed portion may be a down-sampled version of the texture. A down-sampled version of the texture may refer to the sample being represented by a smaller number of data points, such as a smaller pixel density, thereby corresponding to a smaller image resolution of the sample. Alternatively, or additionally, a down-sampled version of the texture may refer to the sample being represented by a smaller bit depth, e.g., a smaller number of colors. Yet another option of a down-sampled version may be representation of the texture having a reduced transparency range, e.g., by reducing/adjusting the number of alpha channels, or reducing a complexity of possible light reflections, or the like. The down-sampled version of the texture may be obtained utilizing any adequate compression technique.

Owing to the presumed periodic pattern of the surface of the 3D object 1000, the total surface of the 3D object 1000 may be represented by a number of 2D images corresponding to area being substantially smaller than the area of the total surface of the 3D object 1000. Hence, at least one 2D image may be used at a plurality of locations of the 3D object 1000 due to the periodic pattern of the texture of the 3D object 1000. Conversely, each 2D image of the set of 2D images may represent the texture of the 3D object 1000 at a plurality of portions of the 3D object 1000. Any type of neural network scheme is possible to use for training to output a 2D image representing a best match texture. The method 100 may thus comprise learning to recognize a displayed portion of the 3D object 1000 and subsequently choose a 2D image corresponding to the displayed portion of the 3D object 1000 to further enhance details in the texture of the displayed portion.

Alternatively, the finding of a best correspondence between the portion of the 3D object 1000 and the images of the set of 2D images may comprise any ordinary image comparison technique. Such an image comparison technique may be an algorithm for comparing images, patterns or textures of an object to images of a database that are similar to the object of the image and use the outcome for determining, e.g., a periodically occurring pattern. The image comparison algorithm may include one or more of a pixel-to-pixel comparison, edge detection/comparison, keypoint matching, histogram methods, keypoint recognition using randomized trees, or the like. The matching of the 2D image towards the surface of the 3D object 1000 may be done substantially in real-time by comparing a current 3D view with the images of the set of 2D images such that the most appropriate 2D image is selected.

The finding of a best correspondence between the portion of the 3D object 1000 and the images of the set of 2D images may comprise accessing a conversion table between specific portions of the 3D object 1000 and the 2D images in the set of 2D images. Such a conversion table may comprise a table between the surface of the 3D object 1000 and the images of the set of 2D images, wherein positions, sizes and/or relevant rotations of the images may be determined. The conversion table and the 2D images may be transferred to the user's electronic device and stored thereon while the user chooses to explore a specific 3D model.

Should any or both of the above-mentioned neural-network technique and the ordinary image comparison technique be too slow or demand too much data to be transferred, the conversion table may alternatively be used, wherein the conversion table may comprise precomputed positions, sizes and/or relevant rotations of the images of the set of 2D images to be stored on a server, a device, or the like.

The method 100 may recognize a displayed portion 500 despite a significant angle V between the surface normal 510 of the surface of the displayed portion 500 and the view direction 270 when displaying the displayed portion 500. Such a recognition may utilize any adequate linear transformation algorithm, such as a direct linear transformation scheme, to minimize errors and/or enhancing the learning rate while recognizing the displayed portion 500. The recognition may comprise utilizing any adequate manifold transformation for transforming a possibly curved surface of the displayed portion to a corresponding flat surface to be compared to a corresponding 2D image of the set of 2D images, to minimize errors and/or enhancing the learning rate while recognizing the displayed portion 500.

Each such a 2D image of the set of 2D images represents the texture of the 3D object 1000 at a specific portion of the 3D object 1000. At least one 2D image of the set of 2D images represents the texture of the 3D object 1000 at a plurality of portions of the 3D object 1000. Assuming temporarily that the surface of the 3D object 1000 is flat, the periodic pattern of the surface of the 3D object 1000 is represented by a number of "unit cells", wherein each unit cell is essentially identical to any other unit cell of the surface, thereby repeating itself over the surface to form a set of densely packed tiles to represent the whole surface of the 3D object 1000. Hence, the end points of any translation vector of the periodic pattern of the surface contain similar digital information, apart from possible light effects, shadowing, or the like. A user zooming in on an arbitrarily chosen specific portion of the 3D object 1000 hence likely ends up by viewing a plurality of adjacent tiles. The method 100 may in such a situation stitch together such a plurality of tiles to seamlessly represent the specific portion of the 3D surface by a corresponding 2D image. This applies equally well to curved surfaces as of the above-mentioned teachings. The number of 2D images representing the whole surface of the 3D object 1000 may be less than 20, or more preferably less than ten.

The surface of the 3D object 1000 may comprise a plurality of materials, wherein respective material of the plurality of materials comprises a certain periodic pattern. The method and the electronic device described above and below, may in such a situation be applied to respective material of the plurality of materials. For instance, the number of 2D images representing respective material of a plurality of materials of the surface of the 3D object 1000 may be less than 20, or more preferably less than 10. Optionally, the execution of a 3D to 2D transition 30 may further comprise, while displaying the determined portion of the 3D object 1000, shifting 50 a view direction of the 3D object 1000 to be parallel with a surface normal of the surface of the determined portion of the 3D object 1000. If the determined portion of the 3D object is curved, an average surface normal can be calculated to be used for the shifting 50 of the view direction. The shifting 50 of the view angle is schematically displayed in FIG. 2. The wording "parallel" may herein refer to substantially parallel. Hence, an angle between two "parallel" lines as referred to herein may lie in the range 0°±5°. Further, the wording "parallel" does herein excluding distinguishing between parallel and antiparallel lines/vectors/directions, etc. For instance, when viewing the displayed portion straight from above, a surface normal vector of the displayed portion may be opposingly directed towards the view direction, the surface normal and the view direction thereby, being mathematically correct, being "antiparallel". A similar tolerance as that described in connection to the wording "parallel" above may apply for the wording "perpendicular". That is, the angle between two "perpendicular" lines as referred to herein may lie in the range 90°±5°. A user may hence start viewing the surface of the 3D object 1000 at a start position 200 and choose a region of the 3D object 1000 of interest, the region corresponding to the determined portion. Again, the determined portion may presumably be flat, such that each point on the determined portion is defined by two space coordinates. The view angle V may be defined as a solid angle V between the surface normal 510 of the determined portion 500 and an artificial viewing point 250 in the 3D model. The shifting 50 of the view angle V may continuously converging towards being parallel to the surface normal 510 of the surface of the 3D object 1000. The shifting 50 of the view angle V may be linearly proportional to the zoom level. The shifting 50 of the view angle V may be linearly proportional to the zoom-in duration, i.e., the view angle V may shift X degrees per unit of time during a zoom-in session. The shifting 50 of the view angle V may be subject to a non-linear relationship with the zoom level. For instance, the rate of change of the view angle V may be higher in a beginning of a zoom-in session compared to an end of the zoom-in session. An opposing situation may be equally applicable to the method, i.e., the rate of change of the view angle V may be lower in a beginning of a zoom-in session compared to an end of the zoom-in session. Alternatively, the view angle V may be substantially constant during a beginning of a zoom-in session until a certain zoom level is reached, subsequently start shifting the view angle as of the above, or vice versa. The shifting of the view angle may be performed during a time period of the order of seconds.

In other embodiments, the shifting 50 of view angle is not performed. For instance, a present view may be faded between a 3D view of the 3D object 1000 and the 2D image when the view angle is non-parallel to a surface normal of the determined portion. Another example is that a present view may momentarily shift between a 3D view of the determined portion and a corresponding 2D image.

The method 100 comprises displaying 60 the 2D image, wherein a resolution of the 2D image is higher than a resolution of the texture of the portion of the 3D object 1000 at the zoom-in threshold. In the case of performing the step 50 of shifting, the step of displaying 60 the 2D image may be made upon the shifting 50 is completed.

Upon executing 30 the 3D to 2D transition, the 3D to 2D transition may comprise displaying a merge of the portion of the 3D object 1000 and the 2D image. Such a merge of the portion of the 3D object 1000 and the 2D image may be set to gradually change from 100% of the portion of the 3D object 1000 to 100% of the 2D image. Such a gradual change may be done during a merge duration being a period of time of the order of seconds. Such a gradual change may be a linear gradual change in that the merge linearly changes from 100% of the portion of the 3D object 1000 to 100% of the 2D image during the merge duration. The gradual change may however exhibit any non-linear gradual change, e.g., the merge quadratically changing from 100% of the portion of the 3D object 1000 to 100% of the 2D image during the duration of the merge.

The method 100 may further comprise determining an identifier of the 3D object 1000, thereby determining the set of 2D images. The identifier may correspond to a class of objects, e.g., sofas, pillows, carpets, or the like. The identifier may also correspond to a specific type of object within a class of objects, such as a specific type of sofa or a specific type of pillow. The identifier may identify the pattern of the texture. It should be noted that a 3D object 1000 may comprise a plurality of patterns (e.g. different materials). In this case, the step of determining the identifier may be based on the determined portion of the 3D object 1000 (i.e. a current field of view of the 3D object 1000), wherein different portions of the 3D object 1000 are tagged or similar with different identifiers. The identifier(s) may be included as metadata of the 3D object 1000. The determining of an identifier may comprise a neural network, an image search algorithm, or the like.

The method may further comprise zooming and/or panning in the 2D image. The displaying of the 2D image, i.e., after the steps 10-40 and, optionally, step 50, have been done, may occasionally be referred to as 2D mode. Similarly, the displaying of the 3D object 1000 or the determined portion 500 of the 3D object 1000, i.e., before the 3D to 2D transition, may refer to being in 3D mode. As with normal 2D images displayed on normal displays, zooming in may be possible when viewing the 2D image. The resolution of the 2D image may be higher than the resolution of the display for displaying the 2D image. Hence, zooming in on the 2D image from a full-display mode of the 2D image, i.e., when the 2D image is substantially fitted to the full area of the display, may allow representation of a sharp zoomed in portion of the 2D image. This may be applicable when, e.g., when a 2D image having a 4*k* resolution is displayed on an HD display. While in 2D mode, the user may optionally change view angle, view perspective, rotation, shading, light effects, and/or the like, of the 2D image to enhance the realism of the texture of the surface of the 3D object 1000. Using haptics, the user may also have an experience of touch by applying forces, vibrations, or motions to the haptics equipment worn by the user, depending on the texture and the zoom level.

Normal panning may be possible in any zoom level of the 2D image, either in a normal view of the 2D image, i.e., the view direction being perpendicular to the display, or after changing view perspective, rotation, or the like. Panning in any zoom level of the 2D image may further be possible along the whole surface of the 3D object 1000, as of the presumed periodic pattern of the texture. In such a situation, the method 100 may account for possible curved surface portions of the 3D object 1000, light effects, or the like.

The method 100 may further comprise, upon a zoom level in the 2D image reaches a zoom-out threshold, executing a 2D to 3D transition comprising displaying a portion of the 3D object 1000 corresponding to a currently displayed portion of the 2D image. The zoom-out threshold may be a zoom level such that being similar to the zoom-in threshold reached by zooming in on the 3D object 1000. Hence, the method 100 may, at least partly, comprise a reverse ordering of the steps 10-40, the optional step 50, and step 60, allowing zooming out from a zoomed in 2D image to displaying a corresponding portion of the surface of the 3D object 1000. Zooming out to display the 3D object 1000 in its entirety may further be possible. A trace of a zoom-out path, while zooming out from a central point 260 of the determined portion 500, may be similar to a trace of a preceding zoom-in path on the determined portion 500. That is, the view direction may, with respect to the the surface normal 510 of the determined portion 500, be similar to a corresponding zoom-in path for each viewing distance. Alternatively, the zoom-out path may be different from the zoom-in path. For instance, a zoom-out path may be such that the view direction is parallel to the surface normal of the determined portion during the entire zoom-out path. Provided panning has been done, while in a zoomed in position of the 2D image, the zoom-out path may originate from a centered point of a presently displayed content and proceed along a path being parallel, i.e., shifted by a previously panned distance, to the zoom-in path. Alternatively, the zoom-out path gradually converges to the zoom-in path such that the start position may be reached when regaining the viewing distance of the start position.

Turning to FIG. 3, there is shown, highly schematically, a subset of the steps of the method 100. FIG. 3 aims to further facilitate the understanding of the method 100. In FIG. 3, the view direction is directed perpendicularly into the display/paper, in contrast to FIG. 2, in which the view direction is seen from a side view. More specifically, a determined portion 500 comprising a periodically occurring pattern 520 is shown with different view directions 310;320;330 with respect to a surface normal of the determined portion 500. At 310 the angle between a normal vector of the surface of the determined portion and the view direction is relatively large. While displaying the determined portion 500 of the 3D object 1000, upon zooming in on the determined portion 500, the angle between the normal vector and the view direction gradually or stepwise decreases. Zooming in further (iii), still while displaying the determined portion 500 of the 3D object 1000, the above-mentioned angle eventually approaches zero degrees, such that the normal vector 510 of the surface of the determined portion 500 and the view direction becomes parallel. For convenience, only the apparent shift in view direction, and not the apparent magnification due to the increasing zoom level, is shown in 310, 320 and 330. Further, the periodically occurring pattern of the texture of the determined portion 500 is here depicted with an excessively scarce image resolution to emphasize the difference in resolution of viewing the determined portion 500 in 3D mode 310;320;330 compared to viewing the determined portion 500 in 2D mode 340;350. After the above-mentioned 3D to 2D transition has been executed, a 2D image 340 of the determined portion 500 is displayed, the 2D image having a higher resolution than the resolution of the texture of the determined portion 500 of the 3D object 1000 at the zoom-in threshold. Being in the 2D mode enables further zooming in 350 for exploring details of the texture of the determined portion 500.

Figure 4:
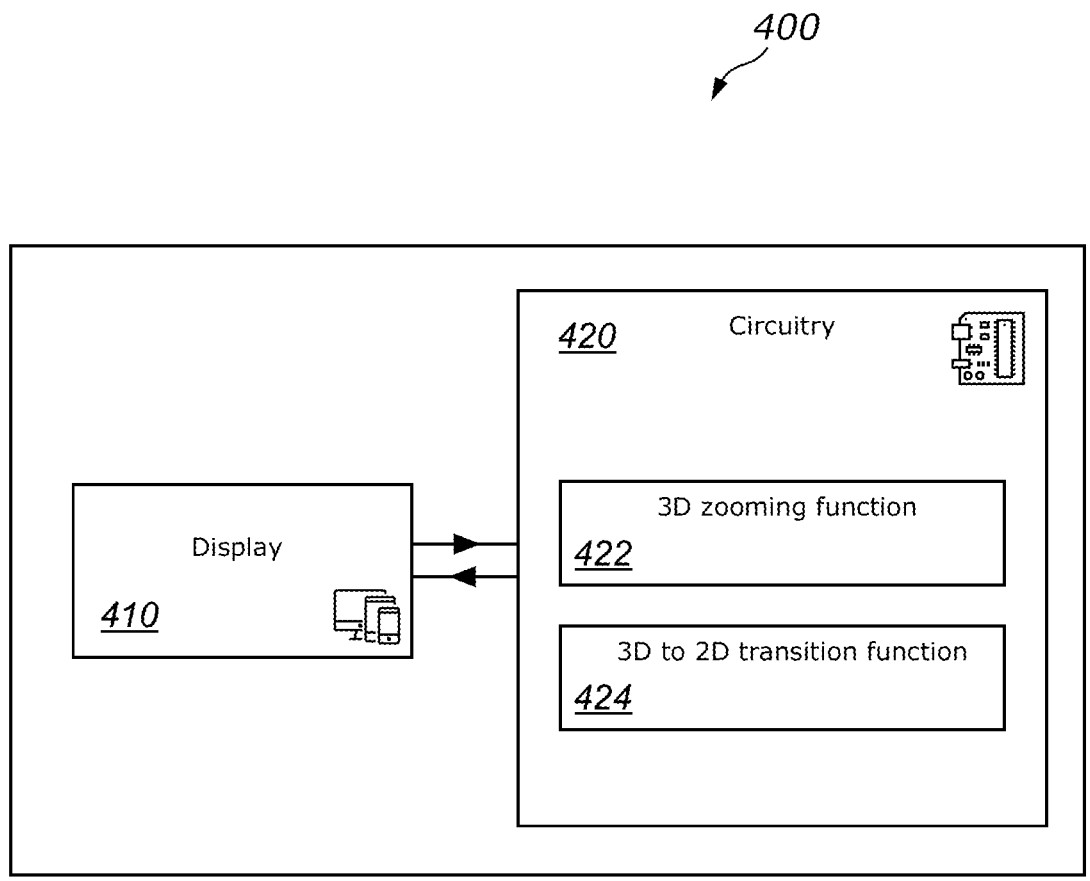
FIG. 4 schematically shows an electronic device on which the method may be implemented.

In connection with FIG. 4 an electronic device 400 on which the disclosed method 100 is implemented.

The electronic device 400 comprises a display 410. The display 410 may be any type of display for displaying digital information. By way of example, the display may be any one of a smartphone display, a computer display, a tablet display, a TV, smart glasses, a dedicated AR or VR device, or the like. The display 410 may be an integral part of the electronic device 400. The display 410 may be freestanding such that being configured to wirelessly communicate with circuitry 420 of the electronic device 400, e.g., by Bluetooth, Wi-Fi, or the like, the circuitry 420 being further described below. The display 410 may also communicate with the circuitry 420 by wire.

The electronic device 400 comprises circuitry 420.

The circuitry 420 is configured to carry out overall control of functions and operations of the electronic device 400. The circuitry 420 may include a processor, such as a central processing unit (CPU), microcontroller, or microprocessor. The processor is configured to execute program code stored in the circuitry to carry out functions and operations of the electronic device 400.

Executable functions, further described below, may be stored on a memory. The memory may be one or more of a buffer, a flash memory, a hard drive, a removable media, a volatile memory, a non-volatile memory, a random access memory (RAM), or other suitable devices. In a typical arrangement, the memory may include a non-volatile memory for long term data storage and a volatile memory that functions as system memory for the circuitry 420. The memory may exchange data with the circuitry 420 over a data bus. Accompanying control lines and an address bus between the memory and the circuitry 420 may be present.

Functions and operations of the circuitry 420 may be embodied in the form of executable logic routines, e.g., computer-code portions, software programs, etc., that are stored on a non-transitory computer readable medium, e.g., the memory, of the electronic device 400 and are executed by the circuitry 420 by, e.g., using the processor. The functions and operations of the electronic device 400 may be a stand-alone software application or form a part of a software application that carries out additional tasks related to the electronic device 400. The described functions and operations may be considering a method that the corresponding device is configured to carry out. Also, while the described functions and operations may be implemented in a software, such functionality may as well be carried out via dedicated hardware or firmware, or some combination of hardware, firmware and/or software.

The circuitry 420 is configured to execute a 3D zooming function 422. The 3D zooming function 422 is configured to determine a portion 500 of a 3D object 1000 corresponding to a zoom level and display the determined portion 500 of the 3D object 1000 including a texture comprising a periodic pattern 520 on the display 410.

The circuitry 420 is configured to execute a 3D to 2D transition function 424 configured to monitor the zoom level upon the zoom level reaching a zoom-in threshold execute a 3D to 2D transition comprising identify a 2D image representing the texture of the currently displayed portion of the 3D object 1000 from a set of 2D images, each 2D image of the set of 2D images representing the texture of the 3D object 1000 at a specific of portion of the 3D object 1000, wherein at least one 2D image of the set of 2D images represents the texture of the 3D object 1000 at a plurality of portions of the 3D object 1000, and display the 2D image on the display 410, wherein a resolution of the 2D image is higher than a resolution of the texture of the portion 500 of the 3D object 1000 at the zoom-in threshold.

Figure 5:
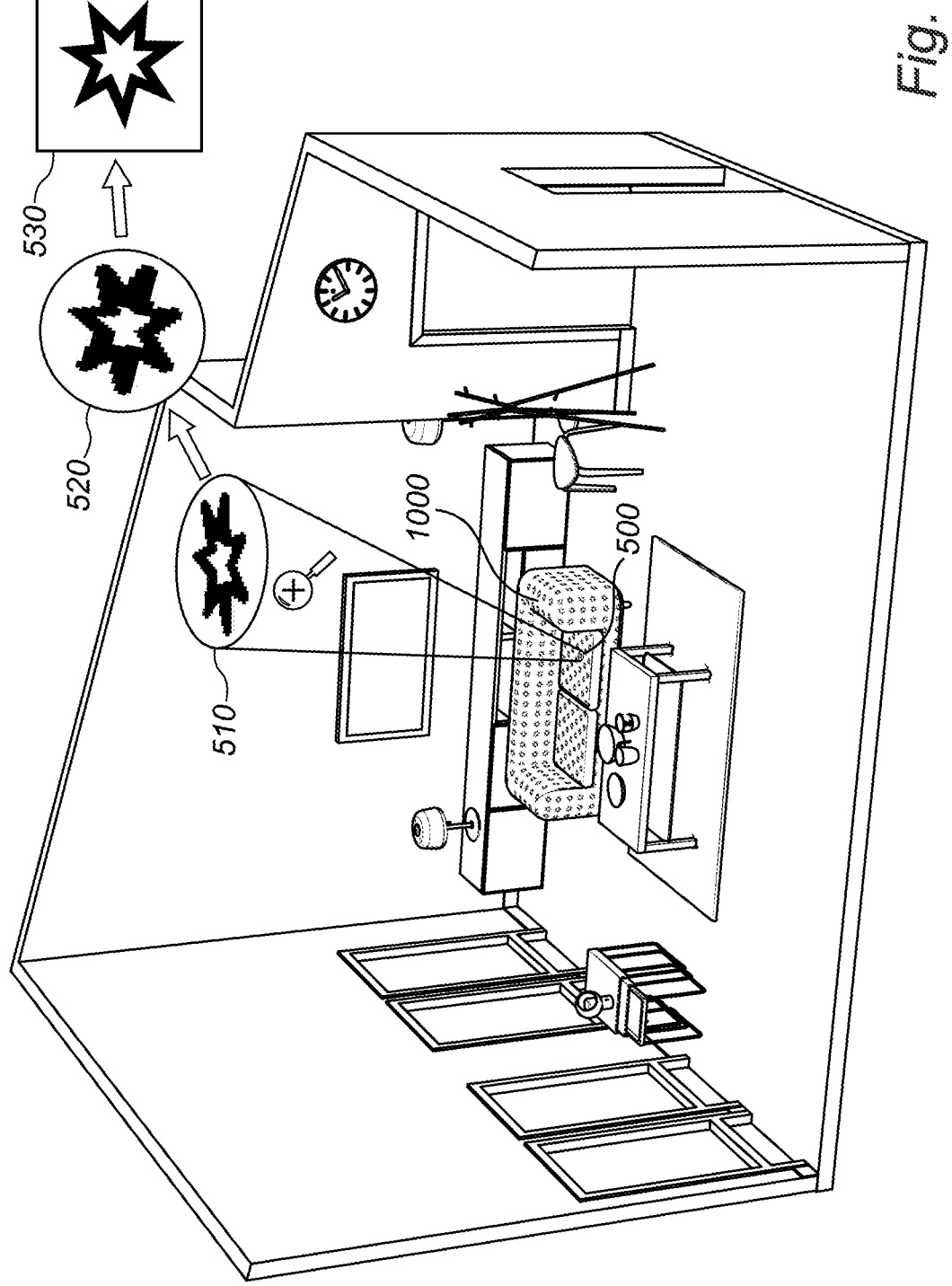
FIG. 5 shows a scene comprising a 3D object comprising a texture having a periodic pattern.

In connection with FIG. 5, there is shown an at least partly virtual scene comprising a 3D object 1000 comprising a texture having a periodic pattern. The scene may be fully computer generated scene, or a partly computer generated scene such as an augmented reality scene. The 3D object 1000 is here exemplified as a sofa comprising periodically occurring stars as a pattern of a clothing. The user may zoom in on a determined portion 500 of the texture. Here, the determined portion 500 has a surface normal, or, more correctly, a plurality of slightly differently directed surface normals, being non-parallel to a view direction. In FIG. 5, the view direction is perpendicular to a display for viewing FIG. 5, or a paper copy of FIG. 5, provided FIG. 5 is printed, etc. At a first display mode 510, the determined portion 500 is zoomed in to a certain extent, wherein an angle between a surface normal of the determined portion 500 and the view direction is relatively large. At a second display mode 520, a shift of the view direction of the determined portion has optionally been done to be parallel with a surface normal of the determined portion 500. At a third display mode 530, the 3D to 2D transition has been executed for displaying a corresponding 2D image of the determined portion 500, wherein the resolution of the 2D image is higher than the resolution of the texture of the determined portion of the 3D object at the zoom-in threshold. The periodically occurring pattern of the texture of the determined portion 500 is here depicted excessively scarce to emphasize the difference in resolution of viewing the determined portion 500 in the first and the second display mode 510;520 compared to viewing the determined portion 500 in the third display mode 530. Details associated with the display modes 510;520;530 are described in the text above.

Other features and embodiments of the electronic device may be applicable to the above-mentioned specification of the method 100.

The person skilled in the art realizes that the present invention by no means is limited to the preferred embodiments described above. On the contrary, many modifications and variations are possible within the scope of the appended claims.

Additionally, variations to the disclosed embodiments can be understood and effected by the skilled person in practicing the claimed invention, from a study of the drawings, the disclosure, and the appended claims.

What is claimed is:

1. A computer implemented method for displaying details of a texture of a three-dimensional, 3D, object, the texture comprising a periodic pattern, the method comprising:
   providing a set of two-dimensional, 2D, images, wherein each 2D image of the set of 2D images represents the texture of the 3D object at a plurality of nonadjacent portions of the 3D object;
   displaying a portion of the 3D object on a display;
   zooming in on the 3D object, whereby the portion of the 3D object displayed on the display gradually decreases in size;
   upon a size of the portion of the 3D object displayed on the display falling below a first threshold size, identifying a 2D image from the set of 2D images by finding a best correspondence between the texture of the portion of the 3D object displayed on the display and the 2D images of the set of 2D images, wherein a level of detail of the identified 2D image is larger than a level of detail of the texture of the portion of the 3D object displayed on the display; and
   upon a size of the portion of the 3D object displayed on the display falling below a second threshold size, executing a 3D to 2D transition comprising:
      hiding the 3D object and displaying the identified 2D image on the display.

2. The method according to claim 1, wherein the 3D to 2D transition further comprises, prior to hiding the 3D object and displaying the identified 2D image, gradually shifting a view direction of the portion of the 3D object displayed on the display to be parallel with a surface normal of a surface of the portion of the 3D object displayed on the display.

3. The method according to claim 1, further comprising determining an identifier of the 3D object, thereby determining the set of 2D images.

4. The method according to claim 1, wherein finding the best correspondence between the texture of the portion of the 3D object displayed on the display and the images of the set of 2D images comprises inputting a sample of the texture of the portion of the 3D object displayed on the display in a neural network being trained to output a 2D image representing a best match.

5. The method according to claim 1, wherein finding the best correspondence between the texture of the portion of the 3D object displayed on the display and the images of the set of 2D images comprises performing an image comparison between a sample of the texture of the portion of the 3D object and each 2D image in the set of 2D images.

6. The method according to claim 1, wherein finding the best correspondence between the texture of the portion of the 3D object displayed on the display and the images of the set of 2D images comprises accessing a conversion table between specific portions of the 3D object and the 2D images in the set of 2D images.

7. The method according to claim 1, wherein the 3D to 2D transition further comprises displaying a merge of the portion of the 3D object and the 2D image.

8. The method according to claim 7, wherein the merge of the portion of the 3D object and the 2D image is set to gradually change from 100% of the portion of the 3D object to 100% of the 2D image.

9. The method according to claim 1, further comprising zooming and/or panning in the 2D image.

10. The method according to claim 9, further comprising, upon a zoom level in the 2D image reaches a zoom-out threshold, executing a 2D to 3D transition comprising displaying a portion of the 3D object corresponding to a currently displayed portion of the 2D image.

11. A non-transitory computer-readable storage medium having stored thereon program code portions which, when executed on a device having processing capabilities, cause the device to:
   provide a set of two-dimensional, 2D, images, wherein each 2D image of the set of 2D images represents a texture of the 3D object at a plurality of nonadjacent portions of the 3D object;
   display a portion of the 3D object on a display;
   zoom in on the 3D object, whereby the portion of the 3D object displayed on the display gradually decreases in size;
   upon a size of the portion of the 3D object displayed on the display falling below a first threshold size, identify a 2D image from the set of 2D images by finding a best correspondence between the texture of the portion of the 3D object displayed on the display and the 2D images of the set of 2D images, wherein a level of detail of the identified 2D image is larger than a level of detail of the texture of the portion of the 3D object displayed on the display; and
   upon a size of the portion of the 3D object displayed on the display falling below a second threshold size, execute a 3D to 2D transition comprising:
      hide the 3D object and display the identified 2D image on the display.

12. An electronic device comprising:
   a display configured for displaying details of a texture of a three-dimensional, 3D, object, the texture comprising a periodic pattern; and
   circuitry configured to:
      provide a set of two-dimensional, 2D, images, wherein each 2D image of the set of 2D images represents the texture of the 3D object at a plurality of nonadjacent portions of the 3D object;
      display a portion of the 3D object on the display;
      zoom in on the 3D object, whereby the portion of the 3D object displayed on the display gradually decreases in size;
      upon a size of the portion of the 3D object displayed on the display falling below a first threshold size, identify a 2D image from the set of 2D images by finding a best correspondence between the texture of the portion of the 3D object displayed on the display and the 2D images of the set of 2D images, wherein a level of details of the identified 2D image is larger than a level of details of the texture of the portion of the 3D object displayed on the display; and upon a size of the portion of the 3D object displayed on the display falling below a second threshold size, execute a 3D to 2D transition comprising:

hide the 3D object and display the identified 2D image on the display.

13. The electronic device according to claim 12, wherein the 3D to 2D transition further comprises, prior to hiding the 3D object and displaying the identified 2D image, gradually shifting a view direction of the 3D object to be parallel with a surface normal of the portion of a surface of the 3D object displayed on the display.

14. The electronic device according to claim 12, wherein the display is one of: smartphone display, a computer display, a tablet display, a TV, smart glasses, an augmented reality device, or a virtual reality device.

\* \* \* \* \*